US011838363B2

(12) United States Patent
Slik et al.

(10) Patent No.: US 11,838,363 B2
(45) Date of Patent: Dec. 5, 2023

(54) CUSTOM VIEWS OF SENSOR DATA

(71) Applicant: NetApp Inc., Sunnyvale, CA (US)

(72) Inventors: David Slik, Vancouver (CA); Keith Arnold Smith, Cambridge, MA (US)

(73) Assignee: NetApp, Inc., San Jose, CA (US)

(*) Notice: Subject to any disclaimer, the term of this patent is extended or adjusted under 35 U.S.C. 154(b) by 170 days.

(21) Appl. No.: 16/364,384

(22) Filed: Mar. 26, 2019

(65) Prior Publication Data

US 2020/0145492 A1    May 7, 2020

Related U.S. Application Data

(60) Provisional application No. 62/755,778, filed on Nov. 5, 2018.

(51) Int. Cl.
| H04L 67/565 | (2022.01) |
| H04L 67/5682 | (2022.01) |
| G06F 11/10 | (2006.01) |
| G06F 3/06 | (2006.01) |
| H04L 67/1095 | (2022.01) |
| H04L 67/63 | (2022.01) |
| H04L 67/563 | (2022.01) |
| H04L 67/12 | (2022.01) |

(52) U.S. Cl.
CPC ............ *H04L 67/12* (2013.01); *G06F 3/0604* (2013.01); *G06F 3/065* (2013.01); *G06F 3/067* (2013.01); *G06F 3/0619* (2013.01); *G06F 3/0641* (2013.01); *G06F 3/0683* (2013.01); *G06F 11/1004* (2013.01); *H04L 67/1095* (2013.01); *H04L 67/563* (2022.05); *H04L 67/565* (2022.05); *H04L 67/5682* (2022.05); *H04L 67/63* (2022.05)

(58) Field of Classification Search
CPC ... H04L 67/12; H04L 67/2823; H04L 67/327; G06F 11/1004; G06F 3/0683; G06F 3/065; G06F 3/0604

See application file for complete search history.

(56) References Cited

U.S. PATENT DOCUMENTS

| 6,601,089 | B1 | 7/2003 | Sistare et al. | |
| 8,538,625 | B1* | 9/2013 | Lowchareonkul | B60K 35/00 340/425.5 |
| 8,658,417 | B2* | 2/2014 | Godsey | G01N 35/1067 435/5 |
| 9,275,093 | B2 | 3/2016 | Pandey et al. | |
| 9,763,029 | B2* | 9/2017 | Mirza | H04W 4/70 |

(Continued)

FOREIGN PATENT DOCUMENTS

| CN | 107318168 A | 11/2017 |
| CN | 104917884 B | 1/2018 |

*Primary Examiner* — William G Trost, IV
*Assistant Examiner* — Adam A Cooney
(74) *Attorney, Agent, or Firm* — COOPER LEGAL GROUP, LLC

(57) ABSTRACT

Techniques are provided for offloading the management of sensor data and generating custom views of sensor data. Sensor data received from a data network through a message is stored within storage managed by a computing device. A handle is generated to identify the sensor data. The sensor data within the message is replaced with the handle, and the message is transmitted to a device within the data network. The device may use handles of sensor data to request custom views of sensor data.

20 Claims, 7 Drawing Sheets

(56) References Cited

U.S. PATENT DOCUMENTS

| | | | |
|---|---|---|---|
| 10,178,206 B2 * | 1/2019 | Tessiore | H04L 67/2823 |
| 10,511,696 B2 * | 12/2019 | Mekuria | H04L 69/04 |
| 10,993,097 B1 * | 4/2021 | Stamatakis | G06F 3/04842 |
| 11,069,381 B1 * | 7/2021 | Prater | G11B 27/19 |
| 2006/0288418 A1 | 12/2006 | Yang et al. | |
| 2009/0287456 A1 * | 11/2009 | Tran | H04L 67/12 709/202 |
| 2010/0208637 A1 | 8/2010 | Park et al. | |
| 2012/0004782 A1 * | 1/2012 | Koskan | H04L 67/303 700/291 |
| 2012/0197898 A1 * | 8/2012 | Pandey | G06F 16/2264 707/741 |
| 2012/0310599 A1 * | 12/2012 | Tanaka | A01B 79/005 702/189 |
| 2013/0198197 A1 | 8/2013 | Sawhney et al. | |
| 2013/0268601 A1 * | 10/2013 | Reilly | G05B 23/0267 709/206 |
| 2014/0025338 A1 * | 1/2014 | Blount | G05B 19/406 702/183 |
| 2014/0095439 A1 | 4/2014 | Ram | |
| 2014/0096264 A1 * | 4/2014 | Root | A61B 5/14532 726/27 |
| 2014/0140254 A1 * | 5/2014 | Nieminen | H04L 45/74 370/311 |
| 2014/0212002 A1 | 7/2014 | Curcio et al. | |
| 2014/0289341 A1 | 9/2014 | Occhipinti et al. | |
| 2014/0293993 A1 * | 10/2014 | Ryhorchuk | H04L 67/12 370/350 |
| 2015/0178631 A1 | 6/2015 | Thomas et al. | |
| 2015/0178888 A1 | 6/2015 | Thomas et al. | |
| 2015/0364027 A1 | 12/2015 | Haupt et al. | |
| 2016/0072891 A1 * | 3/2016 | Joshi | G06Q 30/0641 370/254 |
| 2017/0279874 A1 * | 9/2017 | Jolfaei | H04L 67/565 |
| 2018/0144034 A1 * | 5/2018 | Das | G06F 15/7842 |
| 2018/0196816 A1 * | 7/2018 | Maybee | G06F 3/0667 |
| 2018/0220280 A1 * | 8/2018 | Baghel | H04W 4/40 |
| 2018/0246926 A1 | 8/2018 | Altaf et al. | |
| 2018/0300319 A1 * | 10/2018 | Burriesci | G06F 16/285 |
| 2020/0145880 A1 * | 5/2020 | Kubo | H04W 84/18 |

* cited by examiner

CUSTOM VIEWS OF SENSOR DATA

RELATED APPLICATIONS

This application claims priority to United States Provisional Patent Application, titled "STORAGE OFFLOAD ENGINE FOR DISTRIBUTED NETWORK DEVICE LARGE DATA", filed on Nov. 5, 2018 and accorded Application No. 62/755,778, which is incorporated herein by reference.

BACKGROUND

A data network, such as an Internet of Things (IoT), an Industrial Internet of Things (IIoT), or any other network where data is being generated or collected, may comprise sensors that generate sensor data. For example, a security camera may generate imagery, a vehicle may generate locational data, a medical device may generate health data, etc. The data network may comprise a large number of sensors that are generating a substantial amount of sensor data. Some sensors may generate large sensor data, such as videos, images, spectrum data, etc. Other sensors may be high frequency sensors that generate high frequency sensor data, such as where thousands to millions or more data samples are acquired per second.

A distributed data processing architecture may be message based, where messages of data are passed between devices and components of the data network. The messages may be passed using queues and are processed when received. Unfortunately, this architecture has scalability, reliability, and manageability problems when receiving, processing, storing, and transmitting large sensor data and/or high frequency sensor data. This will result in increased latency of processing messages, or the inability to keep up with incoming messages.

DETAILED DESCRIPTION

Figure 1:
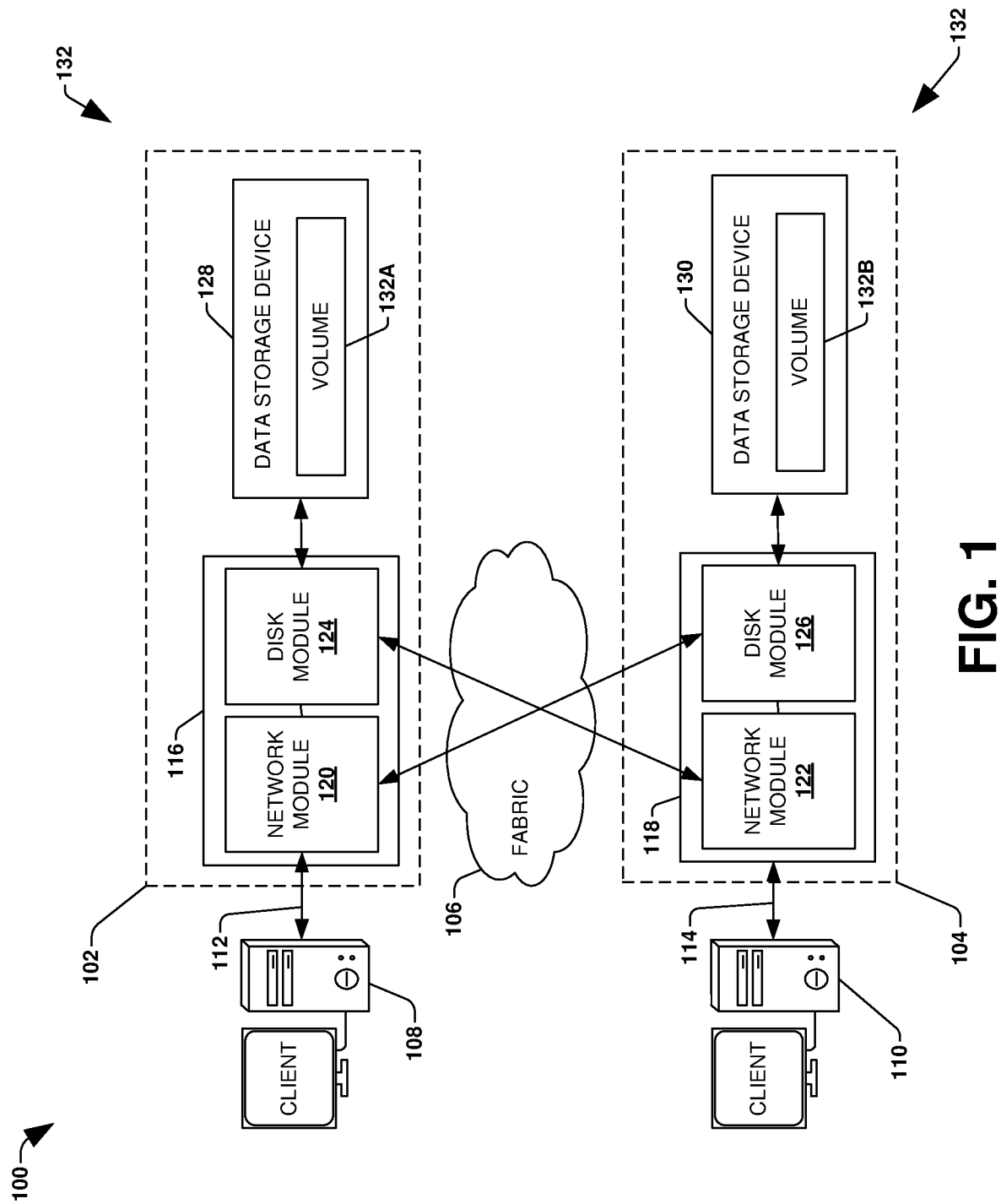
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A data network, such as an Internet of Things (IoT) or an Industrial Internet of Things (IIoT), may comprise sensors that generate sensor data that is typically transmitted through the data network using a message based communication architecture. The data network may be associated with an edge network to which the sensors are connected for data collection and aggregation (e.g., vehicles, security cameras, locational devices such as global positioning systems (GPS), medical equipment, industrial equipment, computers, and other devices with sensors may connect to the edge network). The data network may be associated with a core network comprising dedicated hardware and software. The data network may be associated with a cloud network such as where a hyperscaler is hosted as a service solution in the cloud to provide longer term data storage and processing. Unfortunately, a message-based communication software stack may be unable to adequately store, process, and/or transmit large sensor data and/or high frequency sensor data, thus resulting in reliability issues, increased latency, and other degraded performance issues.

Accordingly, as provided herein, storage, processing, and/or transmission of such sensor data may be offloaded from the message-based communication software stack by a storage offload engine to a separate computing environment, such as an offloaded storage environment of computing devices executing a storage operating system, storage services, deduplication functionality, encryption functionality, compression functionality, replication/migration functionality, and/or other storage functionality for the sensor data. Furthermore, devices within the data network are provided with handles encoded with information relating to sensor data uniquely referenced by the handles. Thus, a device can use the handles to request a view of particular sensor data stored within the offloaded storage environment (e.g., a view of sensor data from a particular type of sensor, a view of sensor data stored in a particular location, a view of sensor data created during a particular timespan, etc.). Offloading the management of sensor data to the offloaded storage environment allows the offloaded storage environment to efficiently manage the storage, processing, and transmission of sensor data such as on demand access to sensor data, along with providing storage functionality for the sensor data such as deduplication, compression, encryption, mirroring, replication, migration, traceability, attestation, etc. Offloading the management of sensor data from the data network 514 reduces burden otherwise placed on the data network 514, and thus performance of the data network 514 will improve (e.g., lowered latency).

To provide for offloading the management of sensor data and the generation of custom views of sensor data, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that offloading the management of sensor data and the generation of custom views of sensor data may be implemented within the clustered network environment 100. It may be appreciated that offloading the management of sensor data and the generation of custom views of sensor data may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
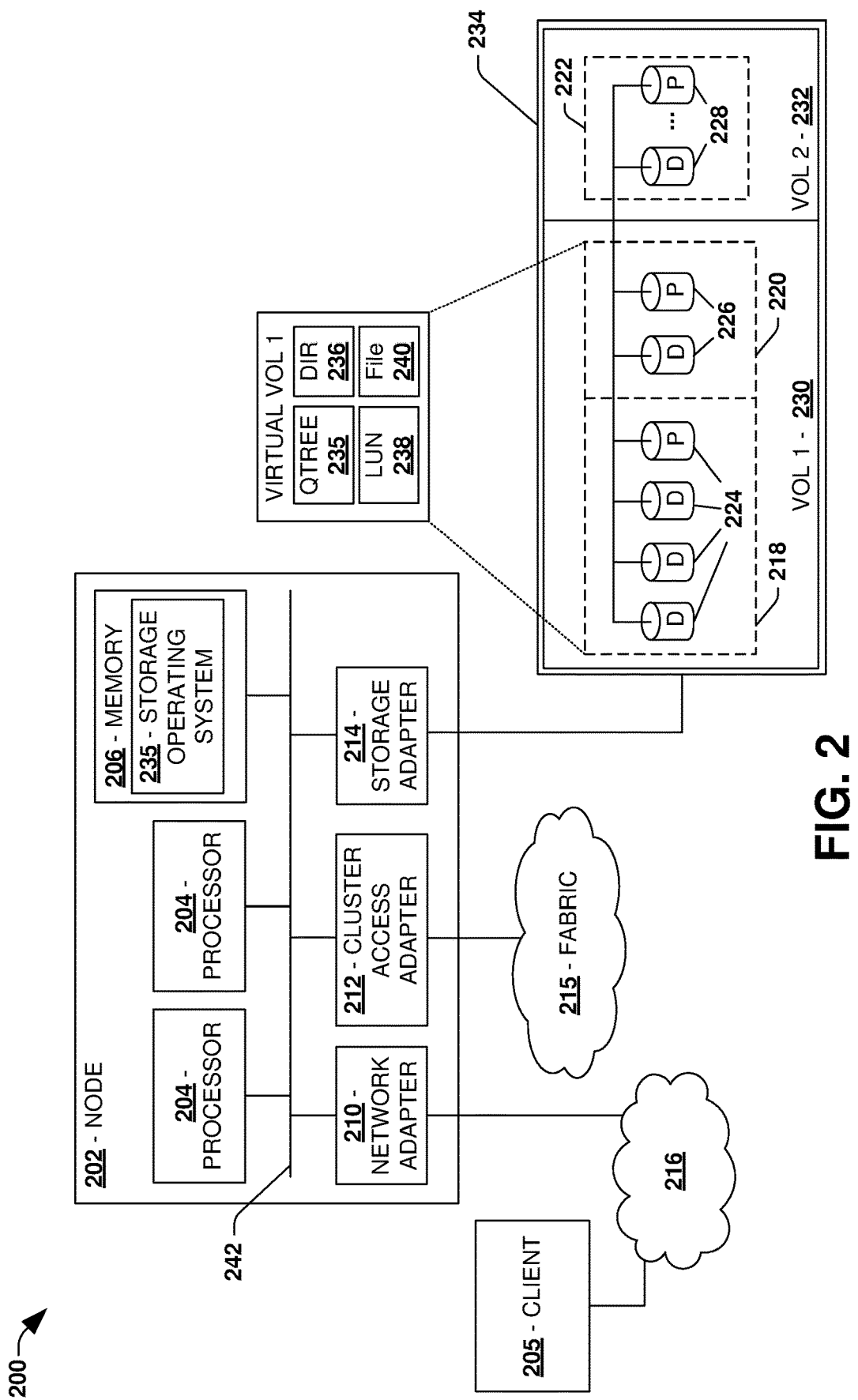
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that offloading the management of sensor data and the generation of custom views of sensor data may be implemented for the data storage system 200. It may be appreciated that offloading the management of sensor data and the generation of custom views of sensor data may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
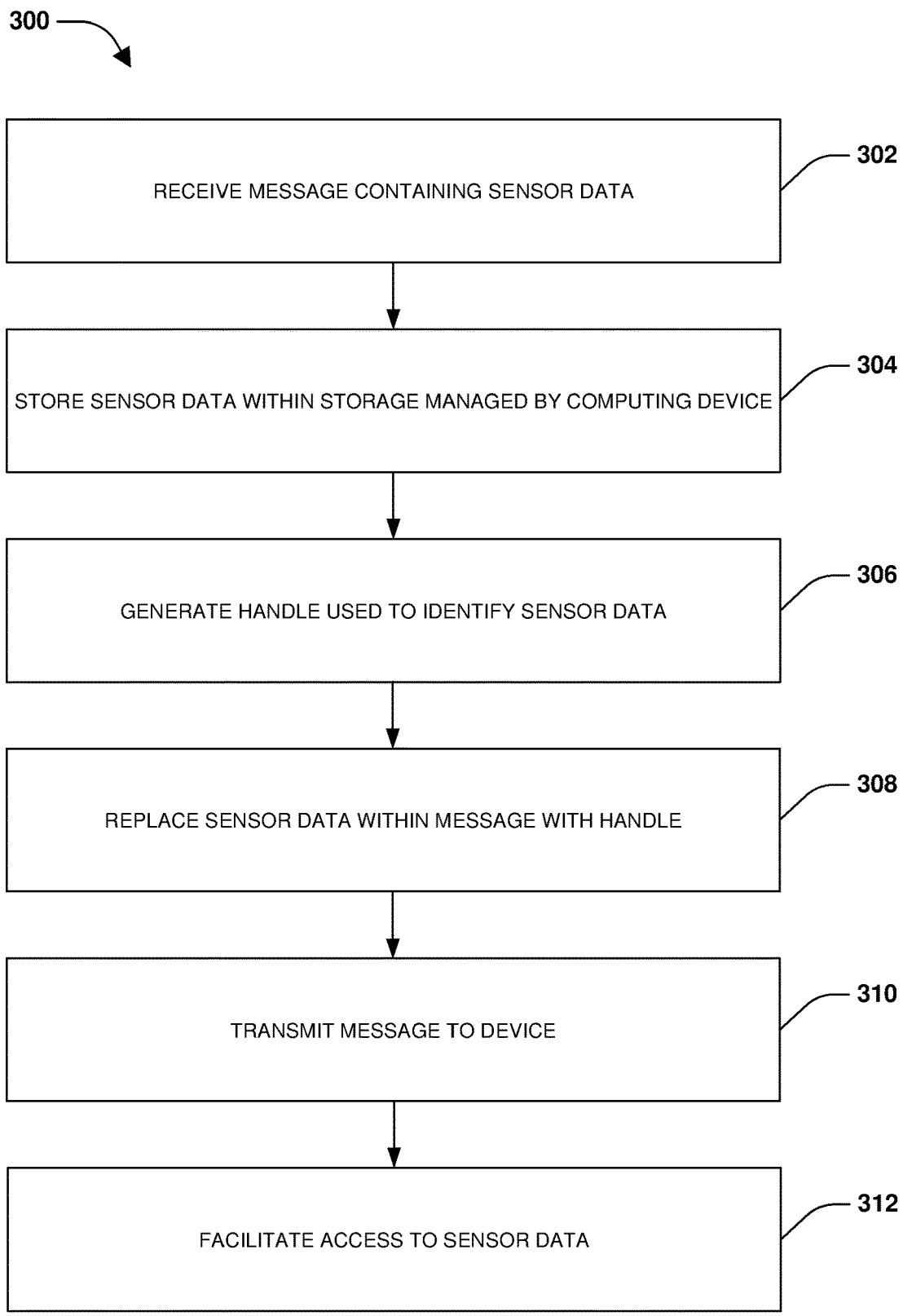
FIG. 3 is a flow chart illustrating an example method for offloading management of sensor data.
Figure 4:
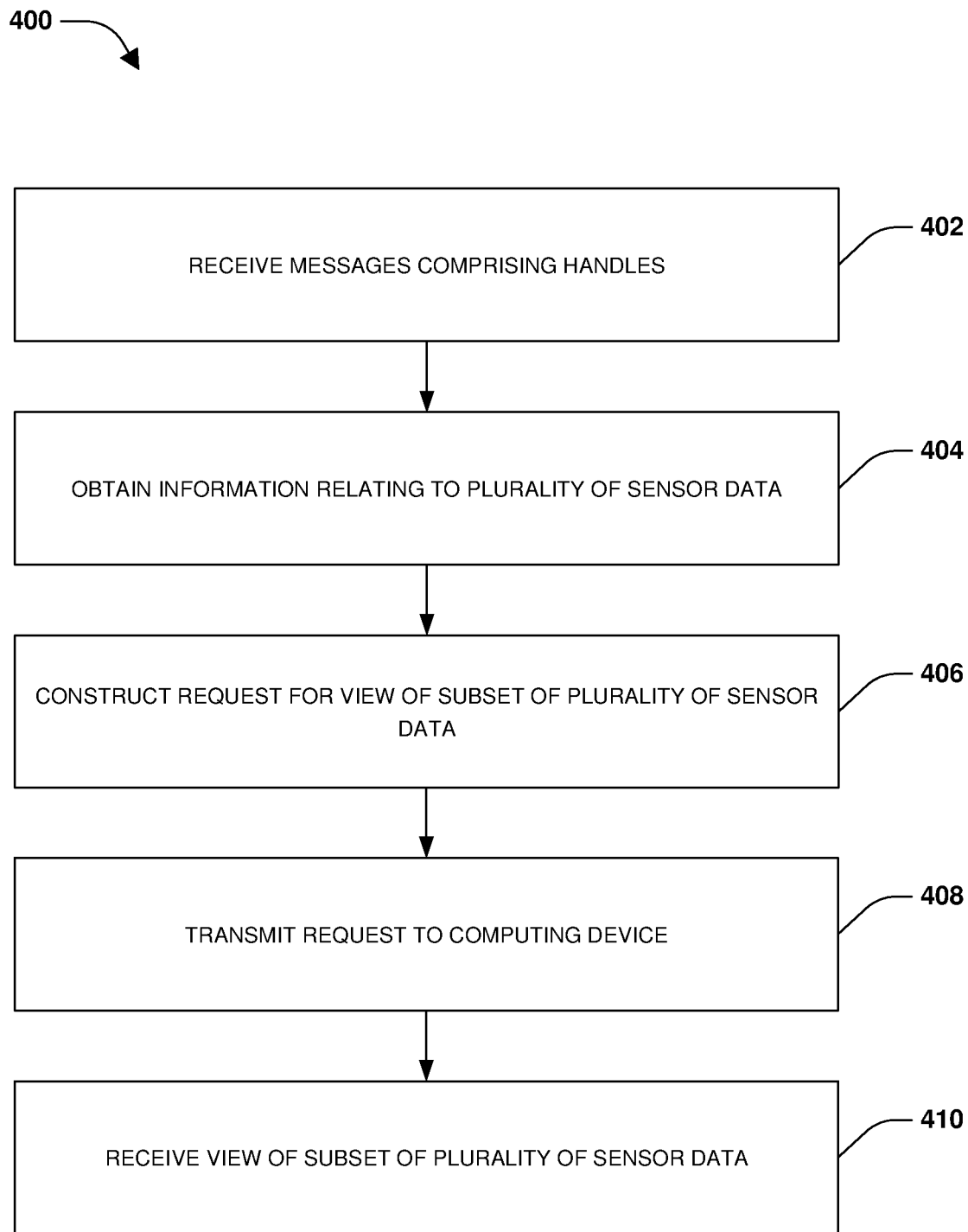
FIG. 4 is a flow chart illustrating an example method for providing custom views of sensor data.
Figure 5:
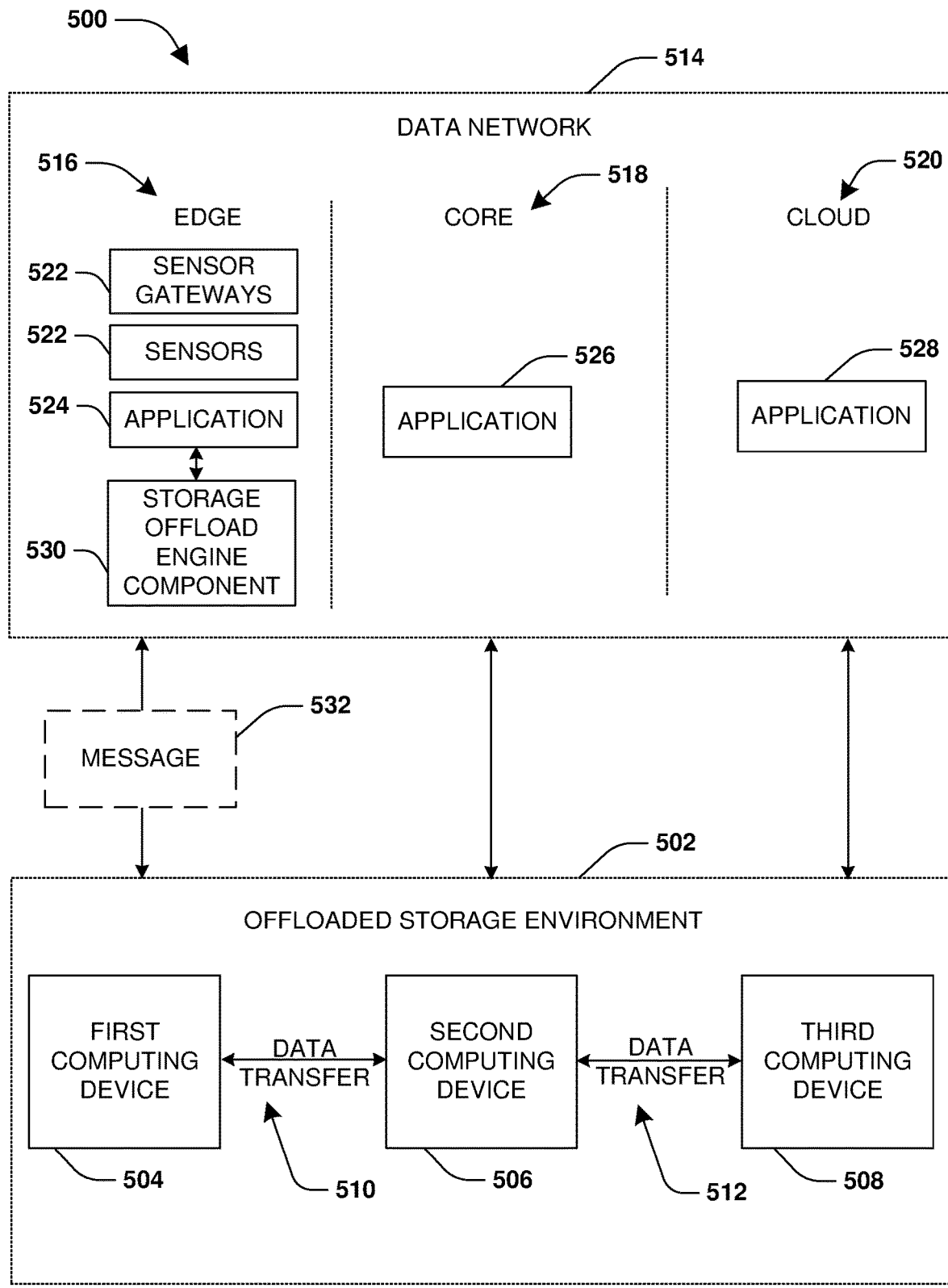
FIG. 5 is a component block diagram illustrating an example system for offloading management of sensor data and for providing custom views of sensor data.

One embodiment of offloading the management of sensor data is illustrated by an exemplary method 300 of FIG. 3 and one embodiment of generating of custom views of sensor data is illustrated by an exemplary method 400 of FIG. 4, which are further described in conjunction with system 500 of FIG. 5. A data network 514 (e.g., an Internet of Things network, an Industrial Internet of Things network, or any other type of network) may be associated with an edge network 516. Various sensors and sensor gateways 522 may be connected to the edge network 516. For example, security cameras, vehicles, sensors attached to industrial equipment, location beacons, and/or a wide variety of sensors or devices coupled to sensors may be connected to the edge network 516. An application 524 within the edge network 516 may be configured to receive/collect sensor data from the sensors or sensor gateways 522. The application 524 may be configured to communicate with other applications within the data network 514 using a message-based communication software stack connected to the data network 514 (e.g., an IoT or IIoT stack). For example, the application 524 may be capable of communicating with an application 526 hosted within a core network 518 of the data network 514. The application 526 may be configured to, among other things, run analytics or perform other processing upon the sensor data. The core network 518 may comprise dedicated hardware and/or software used to execute the application 526. The application 524 and/or the application 526 may be configured to communicate with an application 528 hosted within a cloud network 520 associated with the data network 514. The application 528 may be configured to, among other things, perform long term processing/analytics of the sensor data and/or reconfigure the sensors or sensor gateways 522.

Large sensor data (e.g., images, video, spectrum information, etc.) and/or high frequency sensor data (e.g., a sensor generating millions of data samples a second) can overwhelm the message-based communication software stack used to communicate over the data network 514. This can cause increased latency, reliability issues, inability to keep up with incoming messages, and other performance problems with the message-based communication software stack used to communicate over the data network 514.

Accordingly, as provided herein, a storage offload engine component 530 is configured to reroute the sensor data ordinarily contained within messages being routed through the data network 514 to instead being routed to a separate offloaded storage environment 502. The offloaded storage environment 502 may comprise computing devices, such as a first computing device 504 associated with the edge network 516, a second computing device 506 associated with the core network 518, a third computing device 508 associated with the cloud network 520, that execute storage operating systems and storage services capable of more efficiently managing the storage, processing, and transmission of sensor data than the message-based communication software stack of the data network 514. Offloading these tasks from the message-based communication software stack of the data network 514 to the offloaded storage environment 502 dedicated to managing sensor data will reduce the burden upon the data network 514, thus improving latency, scalability, and operation of devices within the data network 514.

In an example, sensor data is received from a sensor or sensor gateway of the edge network 516 within the data network 514. The storage offload engine component 530 embedded in, integrated in, or otherwise coupled with the application 524 may evaluate the sensor data to determine whether the sensor data should be routed through the data network 514 using the message-based communication software stack of the data network 514 or should be routed to the offloaded storage environment 502 thus skipping the message-based communication software stack. In an example, the storage offload engine component 530 may route the sensor data to the first computing device 504 of the offloaded storage environment 502 based upon the sensor data having a size greater than a size threshold. Such large sensor data may otherwise encumber the message-based communication software stack and data network 514, but the first computing device 504 may be tailored to efficiently store, process, and transmit large sensor data. In another example, the storage offload engine component 530 may route the sensor data through a message 532 to the first computing device 504 of the offloaded storage environment 502 based upon the sensor data being generated at a frequency greater than a frequency threshold. High frequency sensor data may otherwise encumber the message-based communication software stack and data network 514, but the first computing device 504 may be tailored to efficiently store, process, and transmit high frequency sensor data. A variety of other criteria may be used to determine whether the stack of the data network 514 or the offloaded storage environment 502 should receive and manage sensor data. Such criteria may correspond to a data type of sensor data, a location that generated the sensor data, a particular sensor or type of sensor that generated the sensor data, a flag/indicator associated with the sensor data, the sensitivity of the sensor data, the vulnerability of the sensor data to alteration or unauthorized access, the importance of the sensor data, the ultimate destination of the sensor data, the need for additional processing of the sensor data, and/or any other property of the sensor data or sensor that generated the sensor data.

At 302, the message 532 containing the sensor data generated by the sensor or sensor gateway of the edge network 516 of the data network 514 and rerouted by the storage offload engine component 530 is received by the first computing device 504 of the offloaded storage environment 502. The storage offload engine component 530 routed the message 532 to the first computing device 504 based upon a property of the sensor data (e.g., a size property, a frequency property, a type of sensor generating the sensor data, a data format of the sensor data, a creation time of the sensor data, a flag or other indicator, etc.) indicating that the sensor data is to be offloaded from the stack of the data network 514 to the first computing device 504.

At 304, the sensor data is stored within storage managed by the first computing device 504. In an example, the first computing device 504 may manage locally attached storage and/or remotely accessible storage. For example, the first computing device 504 may be in communication with the edge network 516 and may store the sensor data within storage associated with the edge network 516 and/or with the first computing device 504. Thus, the sensor data may be initially stored within storage accessible through the edge network 516 and/or the first computing device 504. As will be described later in further detail, the sensor data may be transferred 510 to the second computing device 506 in communication with the core network 518, and thus the sensor data may be accessible through the core network 518 and/or the second computing device 506. Similar, the sensor data may be transferred 512 to the third computing device 508 in communication with the cloud network 520, and thus the sensor data may be accessible through the cloud network 520 and/or the third computing device 508.

In an example, the first computing device 504 may store a set of data samples as a single object (e.g., a file or other data structure). For example, instead of storing a 100,000 data samples collected over 1 second as individual objects, the 100,000 data samples are stored as a single object of 1 second of data samples. In an example, the first computing device 504 may deduplicate the sensor data based upon a deduplication policy (e.g., a fingerprint of sensor data may be compared with fingerprints of already stored data to determine whether the sensor data is unique and should be stored or is a duplicate of already stored data and merely a pointer should be stored to point to the already stored data). The sensor data may be inline deduplicated before the sensor data is stored within the storage or may be background deduplicated after being stored to the storage. In an example, the first computing device 504 may compress the sensor data based upon a compression policy. In an example, the first computing device 504 may encrypt the sensor data based upon an encryption policy. In an example, the sensor data is stored within an object that is named based upon various factors, such as a creation date, a sensor that generated the sensor data, a data type of the sensor data, etc. In an example, the sensor data is stored with ancillary metadata associated with the object that is extracted, derived and/or associated from/with the sensor data, such as when the sensor data was created, where the sensor data is stored, what sensor or sensor gateway created the sensor data, a location of where the sensor data was generated, a data type or information comprised within the sensor data, attestation and traceability information (timestamp information, event information, information relating to processing and analytics performed upon the sensor data by a particular application at a particular point in time, locations and times at which the sensor data has been stored, transmitted, or processed, etc.), validation and verification information (e.g., a checksum, a hash, a fingerprint), and/or other properties of the sensor or sensor gateway, sensor data, and/or other various factors. In this way, various storage functionality may be implemented within the offloaded storage environment 502 for the offloaded sensor data.

At 306, a handle is generated to identify the sensor data. The handle may be a unique identifier used to reference and/or locate the sensor data. Various information may be encoded into the handle, such as identification information assigned by the application 524, identification information assigned by the first computing device 504, when the sensor data was created, where the sensor data is stored, what sensor created the sensor data, a location of where the sensor data was generated, a data type or information comprised within the sensor data, attestation and traceability information (timestamp information, event information, information relating to processing and analytics performed upon the sensor data by a particular application at a particular point in time, locations and times at which the sensor data has been stored, transmitted, or processed, etc.), validation and verification information (e.g., a checksum, a hash, a fingerprint), and/or other properties of the sensor and/or sensor data. The structure and contents of the handle may be opaque to the applications 524, 526, 528, or the structure and contents of the handle may be visible to the applications 524, 526, 528. As will be described later in further detail, the handle may be used to verify the integrity of sensor data (e.g., a device using the handle to access the sensor data can use the handle to ensure that the received sensor data is in fact the requested sensor data), create custom views of particular sensor data (e.g., view sensor data generated by particular types of sensors during a particular timeframe), etc.

At 308, the sensor data is replaced within the message 532 with the handle. At 310, the message, with the handle (e.g., and without the sensor data), is transmitted to a device within the data network 514. For example, an application executing on the device may be registered or otherwise associated with the sensor data or the sensor (e.g., a security application that uses image recognition functionality to detect threats within images captured by a camera sensor). The device may be connected to the edge network 516, the core network 518 (e.g., a dedicated server executing the security application), and/or the cloud network 520 (e.g., a virtual machine within the cloud network 520 that executes the security application).

At 312, access by the device to the sensor data using the handle may be facilitated. For example, the application 526 within the core network 518 (or the application 528 within the cloud network 520) may transmit a request to the offloaded storage environment 502 to access the sensor data. The request may comprise the handle. The second computing device 506 connected to the core network 518 may receive the request. The second computing device 506 may evaluate the handle to determine whether the sensor data is locally available to the second computing device 506 (e.g., within local storage) or remotely available (e.g., within storage managed by the first computing device 504). Accordingly, the second computing device 506 uses the handle to facilitate data access to the sensor data (e.g., execute a write operation upon the sensor data; retrieve and transmit the sensor data to the second computing device 506 that has requested to read the sensor data; prefetching and data replication and placement rules based on access patterns; etc.). In an example of facilitating access to the sensor data, the sensor data may be represented or accessible through a file system or other hierarchical structure to devices within the data network 514.

The sensor data may be transferred 510, 512 within the offloaded storage environment 502 to storage and/or computing devices, within the offloaded storage environment 502, that are in communication with the edge network 516, the core network 518, and/or the cloud network 520 based upon various policies, on-demand when requested, etc. For example, sensor data may be replicated or mirrored from the storage managed by the first computing device 504 to second storage managed by the second computing device 506 or the third computing device 508 based upon a replication policy (e.g., specifying what sensor data should be replicated, when to replicate the sensor data, where to replicate the sensor data, etc.) or mirroring policy, and thus multiple copies of the sensor data may be stored within the offloaded storage environment 502.

In an example, the sensor may be migrated from the storage of the first computing device 504 to other storage managed by other computing devices based upon a migration policy. For example, the migration policy may specify that sensor data should be migrated to storage of the third computing device 508 based upon a majority or threshold number of requests for that sensor data being received from the cloud network 520 because the third computing device 508 is in communication with the cloud network 520. Similarly, the migration policy may specify that sensor data should be migrated to storage of the second computing device 506 based upon a majority or threshold number of requests for that sensor data being received from the core network 518 because the second computing device 506 is in communication with the core network 518. The migration policy may specify that infrequently accessed sensor data should be stored within particular storage of the offloaded storage environment 502 and that more frequently accessed sensor data should be stored in different storage. In an example, sensor data is transmitted within the offloaded storage environment 502 on demand, such as where the second computing device 506 retrieves the sensor data from storage of the first computing device 504 in order to process the request for the sensor data from the application 526 within the data network 514.

In an example, the computing devices of the offloaded storage environment 502 may process sensor data based upon events or policies. For example, a computing device may perform analytics upon sensor data, track statistics of sensor data (e.g., the amount and type of sensor data being stored, when and how frequently sensor data is accessed, the location of sensor data, what sensors are producing sensor data and how much, etc.), and/or other functionality that may be offloaded from the data network 514 to the offloaded storage environment 502 (e.g., performing image recognition to detect threats, evaluating location data to route a vehicle, evaluating industrial health sensor data to generate an alert of equipment failing, etc.). Various events or polices may trigger execution of such analytics or functionality (e.g., when a threshold amount of a certain type of sensor data is received, when a threshold amount of data from a particular sensor is received, an amount of time elapsing, etc.).

In an example, the computing devices of the offloaded storage environment 502 may transform sensor data based upon events or policies. For example, a computing device may convert between data formats, create derived data representations (e.g. frequency transforms, image thumbnails, multiple resolution video encodings, region selection, region masking, downsampling, decimation, etc.), and/or other functionality that may be offloaded from the data network 514 to the offloaded storage environment 502. Various events or polices may trigger execution of such transformations (e.g., when a threshold amount of a certain type of sensor data is received, when a threshold amount of data from a particular sensor is received, an amount of time elapsing, etc.).

Devices within the data network 514 can use metadata associated with sensor data stored in the offloaded storage environment 502 to provide custom views of sensor data. At 402, a device within the data network 514 (e.g., a device within the cloud network 520 executing the application 528 for analyzing sensor data) receives messages from computing devices within the offloaded storage environment 502. The messages may be associated with a plurality of sensor data generated by the sensors or sensor gateways 522 of the edge network 516. The sensor data may be stored within storage managed by the offloaded storage environment 502, such as storage associated with the first computing device 504 in communication with the edge network 516, a second computing device 506 in communication with the core network 518, and/or a third computing device 508 in communication with the cloud network 520.

At 404, the device may access metadata to obtain information relating to the plurality of sensor data. For example, metadata for sensor data may include various information, such as when the sensor data was created, where the sensor data is stored, what sensor created the sensor data, a location of where the sensor data was generated, a data type or information comprised within the sensor data, attestation and traceability information, validation and verification information, and/or other properties of the sensor and/or sensor data. Such information may be requested from the computing devices in the offloaded storage environment 502.

At 406, a request may be constructed for a view of a subset of the plurality of sensor data. The request may comprise metadata conditions of the subset of the plurality of sensor data. In an example, the request may specify metadata conditions for sensor data collected from a particular sensor or set of sensors (e.g., all photos captured within a particular distance proximity). In an example, the request may specify metadata for sensor data having a first data type (e.g., all temperature sensor data). In an example, the request may specify handles for sensor data having a certain date within a specified timespan. The request may also specify metadata indicating how the resulting matching sensor data is to be structurally organized when presented to the device. In an example, the request may specify metadata for sensor data residing in a particular data repository (e.g., a particular volume, storage device, database, database table, etc.). It may be appreciated that the request may specify various parameters and/or combinations thereof used to request certain sensor data (e.g., request video sensor data that has been processed by a particular application and stored within a particular database).

At 408, the request may be transmitted to the offloaded storage environment 502 such as from the application 528 to the third computing device 508. The third computing device 508 may use the metadata within the request to identify, locate, and retrieve the requested sensor data from storage within the offloaded storage environment 502. At 410, the device receives the view of the sensor data from the offloaded storage environment 502, such as where the application 528 receives the view from the third computing device 508. The view is a custom tailored view of particular sensor data maintained within the offloaded storage environment 502 on behalf of the data network 514. In an example, the device may obtain access to sensor data, using the view, through a file system or other hierarchical, list, or graph structure hosted by the offloaded storage environment 502 and exposed to device within the data network 514. The view may be processed by analytics or other functionality of the device. The view may be displayed through a user interface.

In an example, the view of sensor data comprises first sensor data having a first handle bound to the first sensor data (e.g., the first handle is encoded based upon a property of the first sensor data such as with checksum, security information, a hash or fingerprint, etc.). The device may use the information encoded into the first handle to validate the first sensor data as being the sensor data requested by the device. For example, the device may use encoded checksum information to validate the first sensor data. In an example, the device may evaluate timestamps of the first sensor data to identify events associated with the first sensor data (e.g., a creation timestamp, a storage timestamp, a modify timestamp, a replication timestamp, a migration timestamp, a timestamp indicating certain analysis was performed upon the first sensor data, etc.).

Figure 6:
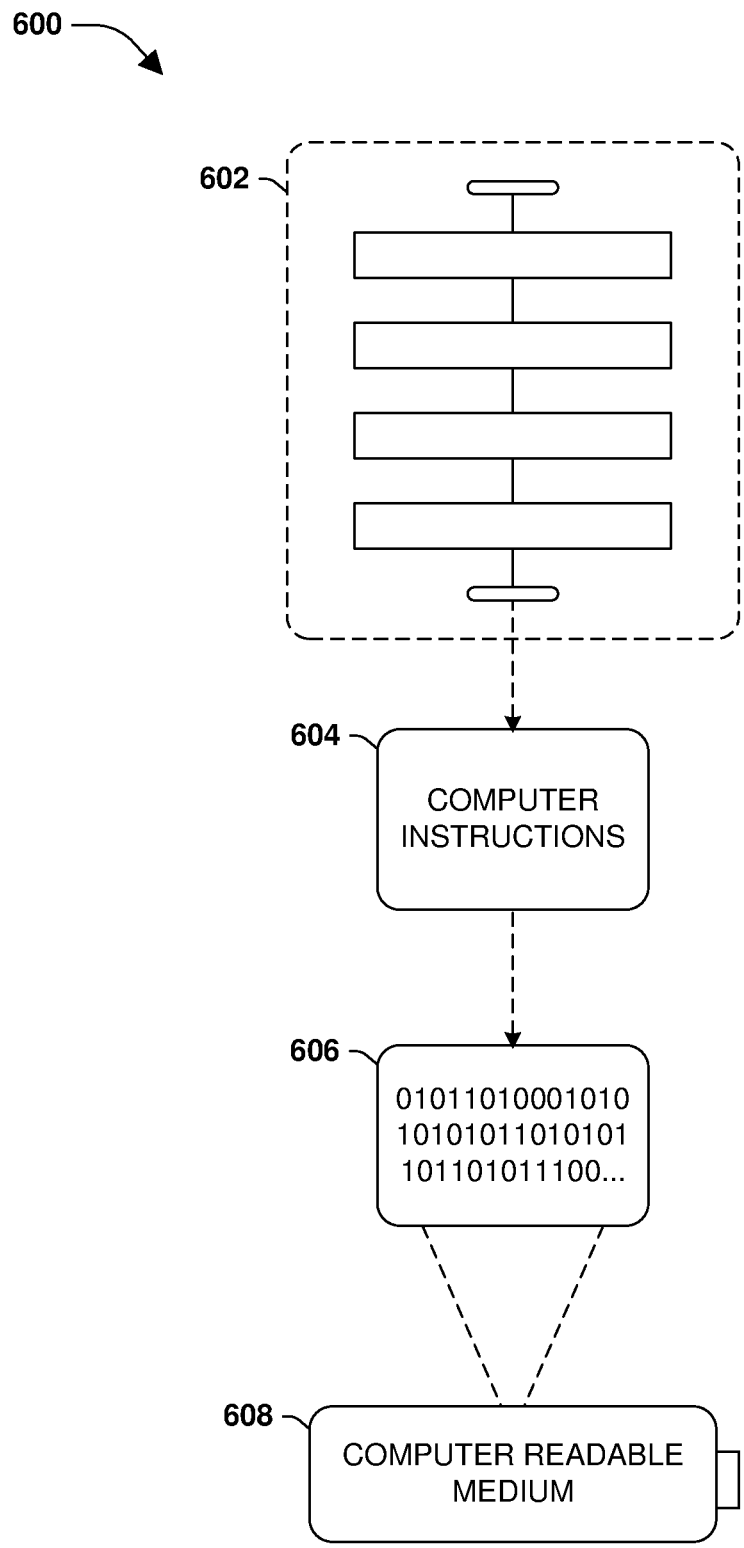
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises a processor-executable computer instructions 604 configured to operate according to one or more of the principles set forth herein. In some embodiments, the processor-executable computer instructions 604 are configured to perform a method 602, such as at least some of the exemplary method 300 of FIG. 3 and/or at least some of the exemplary method 400 of FIG. 4, for example. In some embodiments, the processor-executable computer instructions 604 are configured to implement a system, such as at least some of the exemplary system 500 of FIG. 5, for example. Many such computer-readable media are contemplated to operate in accordance with the techniques presented herein.

Figure 7:
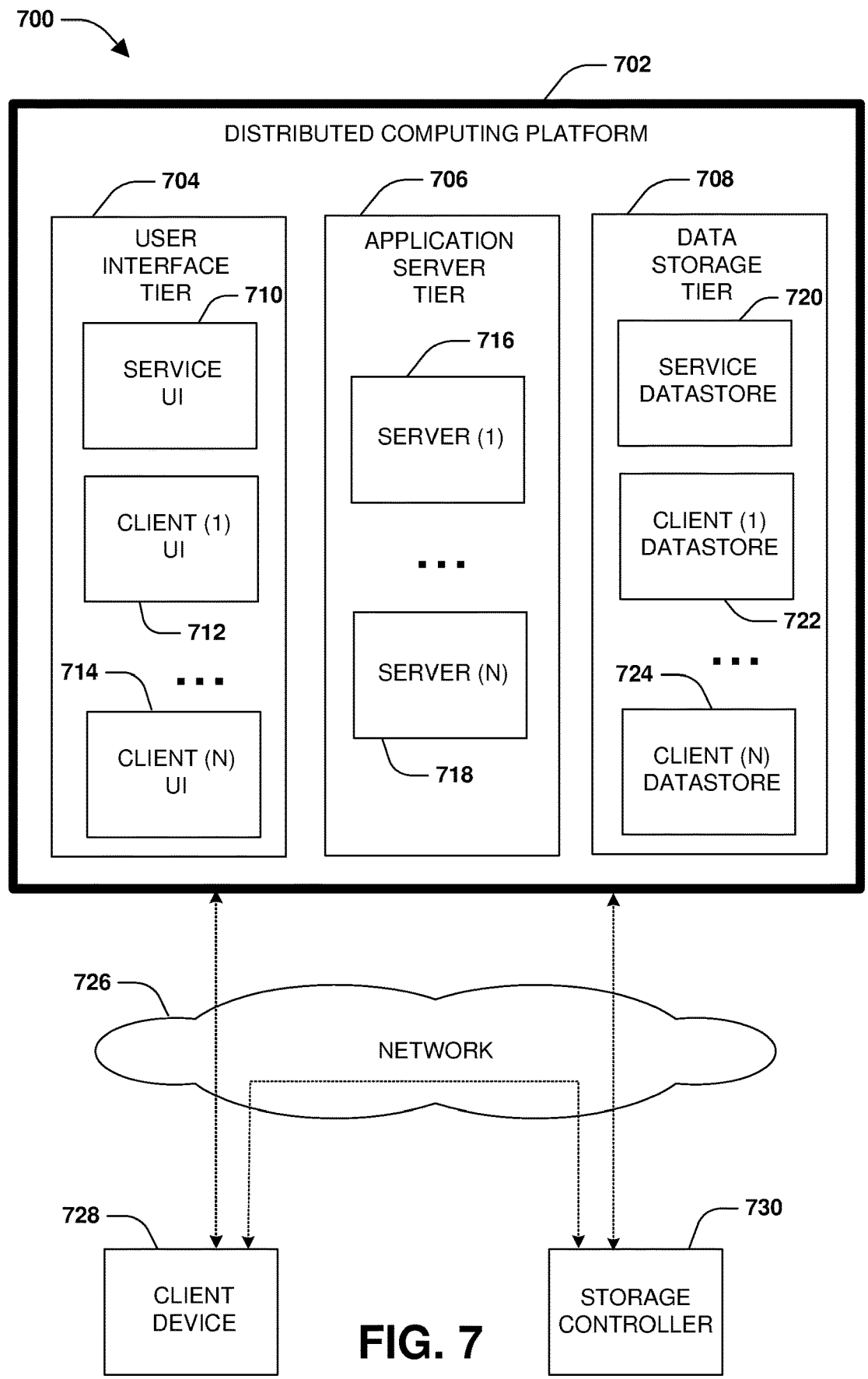
FIG. 7 is a component block diagram illustrating an example computing environment in which an embodiment of the invention may be implemented.

FIG. 7 is a diagram illustrating an example operating environment 700 in which an embodiment of the techniques described herein may be implemented. In one example, the techniques described herein may be implemented within a client device 728, such as a laptop, tablet, personal computer, mobile device, wearable device, etc. In another example, the techniques described herein may be implemented within a storage controller 730, such as a node configured to manage the storage and access to data on behalf of the client device 728 and/or other client devices. In another example, the techniques described herein may be implemented within a distributed computing platform 702 such as a cloud computing environment (e.g., a cloud storage environment, a multi-tenant platform, etc.) configured to manage the storage and access to data on behalf of the client device 728 and/or other client devices.

In yet another example, at least some of the techniques described herein are implemented across one or more of the client device 728, the storage controller 730, and the distributed computing platform 702. For example, the client device 728 may transmit operations, such as data operations to read data and write data and metadata operations (e.g., a create file operation, a rename directory operation, a resize operation, a set attribute operation, etc.), over a network 726 to the storage controller 730 for implementation by the storage controller 730 upon storage. The storage controller 730 may store data associated with the operations within volumes or other datan objects/structures hosted within locally attached storage, remote storage hosted by other computing devices accessible over the network 726, storage provided by the distributed computing platform 702, etc. The storage controller 730 may replicate the data and/or the operations to other computing devices so that one or more replicas, such as a destination storage volume that is maintained as a replica of a source storage volume, are maintained. Such replicas can be used for disaster recovery and failover.

The storage controller 730 may store the data or a portion thereof within storage hosted by the distributed computing platform 702 by transmitting the data to the distributed computing platform 702. In one example, the storage controller 730 may locally store frequently accessed data within locally attached storage. Less frequently accessed data may be transmitted to the distributed computing platform 702 for storage within a data storage tier 708. The data storage tier 708 may store data within a service data store 720, and may store client specific data within client data stores assigned to such clients such as a client (1) data store 722 used to store data of a client (1) and a client (N) data store 724 used to store data of a client (N). The data stores may be physical storage devices or may be defined as logical storage, such as a virtual volume, LUNs, or other logical organizations of data that can be defined across one or more physical storage devices. In another example, the storage controller 730 transmits and stores all client data to the distributed computing platform 702. In yet another example, the client device 728 transmits and stores the data directly to the distributed computing platform 702 without the use of the storage controller 730.

The management of storage and access to data can be performed by one or more storage virtual machines (SMVs) or other storage applications that provide software as a service (SaaS) such as storage software services. In one example, an SVM may be hosted within the client device 728, within the storage controller 730, or within the distributed computing platform 702 such as by the application server tier 706. In another example, one or more SVMs may be hosted across one or more of the client device 728, the storage controller 730, and the distributed computing platform 702.

In one example of the distributed computing platform 702, one or more SVMs may be hosted by the application server tier 706. For example, a server (1) 716 is configured to host SVMs used to execute applications such as storage applications that manage the storage of data of the client (1) within the client (1) data store 722. Thus, an SVM executing on the server (1) 716 may receive data and/or operations from the client device 728 and/or the storage controller 730 over the network 726. The SVM executes a storage application to process the operations and/or store the data within the client (1) data store 722. The SVM may transmit a response back to the client device 728 and/or the storage controller 730 over the network 726, such as a success message or an error message. In this way, the application server tier 706 may host SVMs, services, and/or other storage applications using the server (1) 716, the server (N) 718, etc.

A user interface tier 704 of the distributed computing platform 702 may provide the client device 728 and/or the storage controller 730 with access to user interfaces associated with the storage and access of data and/or other services provided by the distributed computing platform 702. In an example, a service user interface 710 may be accessible from the distributed computing platform 702 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 712, a client (N) user interface 714, etc. The client (1) can access various services and resources subscribed to by the client (1) through the client (1) user interface 712, such as access to a web service, a development environment, a human resource application, a warehouse tracking application, and/or other services and resources provided by the application server tier 706, which may use data stored within the data storage tier 708.

The client device 728 and/or the storage controller 730 may subscribe to certain types and amounts of services and resources provided by the distributed computing platform 702. For example, the client device 728 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 730 can establish a subscription to have access to certain services and resources of the distributed computing platform 702.

As shown, a variety of clients, such as the client device 728 and the storage controller 730, incorporating and/or incorporated into a variety of computing devices may communicate with the distributed computing platform 702 through one or more networks, such as the network 726. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 702, such as a multi-tenant business data processing platform or cloud computing environment, may include multiple processing tiers, including the user interface tier 704, the application server tier 706, and a data storage tier 708. The user interface tier 704 may maintain multiple user interfaces, including graphical user interfaces and/or web-based interfaces. The user interfaces may include the service user interface 710 for a service to provide access to applications and data for a client (e.g., a "tenant") of the service, as well as one or more user interfaces that have been specialized/customized in accordance with user specific requirements, which may be accessed via one or more APIs.

The service user interface 710 may include components enabling a tenant to administer the tenant's participation in the functions and capabilities provided by the distributed computing platform 702, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 708 may include one or more data stores, which may include the service data store 720 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 702 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving, by a device of a data network, messages of sensor data generated by sensors of the data network, wherein the messages comprise handles replacing the sensor data extracted from the messages and offloaded to an offloaded storage environment, and wherein a handle references a storage location of sensor data and is associated with attestation and traceability information related to processing performed upon the sensor data by an application;
   implementing, by an computing device of the offloaded storage environment, a migration policy to selectively migrate portions of the sensor data amongst different storage locations of the offloaded storage environment based upon sensor data access frequencies, wherein the migration policy specifies that the sensor data is to be migrated to a storage location of a different computing device based upon a threshold number of requests for the sensor data received through a cloud network and a core network of the data network;
   constructing and transmitting a request, comprising the handle and metadata conditions used to select the sensor data, to the computing device for a view of the sensor data,
   wherein the view is processed by analytics and functionality of the computing device using the metadata conditions to construct the view through a graphical user interface; and
   receiving and displaying the view through the graphical user interface.

2. The method of claim 1, wherein the constructing comprises:
   constructing the request to specify a metadata condition for sensor data collected from a first sensor.

3. The method of claim 1, wherein the constructing comprises:
   constructing the request to specify a metadata condition for sensor data collected from a defined set of sensors.

4. The method of claim 1, wherein the constructing comprises:
   constructing the request to specify a metadata condition for sensor data having a first data type.

5. The method of claim 1, wherein the constructing comprises:
   constructing the request to specify a metadata condition for sensor data having a creation date within a specified timespan.

6. The method of claim 1, wherein the constructing comprises:
   constructing the request to specify a metadata condition for sensor data residing in a particular storage location.

7. The method of claim 1, comprising:
   extracting security information encoded into the handle, wherein the security information is stored within the handle based upon a property of a sensor that generated the sensor data; and
   utilizing the security information to validate the sensor data of the view being displayed through the graphical user interface.

8. The method of claim 1, wherein the computing device implements a mirroring policy to store multiple copies of the sensor data at the different locations within the offloaded storage environment.

9. The method of claim 1, comprising:
   receiving access to the sensor data through a file system hosted by the computing device.

10. The method of claim 1, comprising:
    receiving access to the sensor data through a hierarchical structure hosted by the computing device.

11. The method of claim 1, wherein a first handle is bound to first sensor data within the sensor data, and the method comprising:
    using data within the first handle to validate the first sensor data.

12. The method of claim 1, comprising:
evaluating timestamps of first sensor data within the sensor data to identify events associated with the first sensor data.

13. The method of claim 1, wherein first sensor data of the sensor data is named based upon a first sensor that generated the first sensor data.

14. A non-transitory machine readable medium comprising instructions for performing a method, which when executed by a machine, causes the machine to:
receive, by a device of a data network, messages of sensor data generated by sensors of the data network, wherein the messages comprise handles replacing the sensor data extracted from the messages and offloaded to an offloaded storage environment, and wherein a handle references a storage location of sensor data and is associated with validation and verification information related to verifying the validity of the sensor data;
implement, by an computing device of the offloaded storage environment, a migration policy to selectively migrate portions of the sensor data amongst different storage locations of the offloaded storage environment based upon sensor data access frequencies, wherein the migration policy specifies that infrequently accessed sensor data is stored within a first storage location based upon less than a threshold number of requests for the infrequently accessed sensor data and frequently accessed sensor data is stored within a second storage location based upon greater than the threshold number of requests for the frequency accessed sensor data;
construct and transmit a request, comprising the handle and metadata conditions used to select the sensor data, to the computing device for a view of the sensor data;
receive and display the view of the sensor data through a graphical user interface;
utilize the validation and verification information extracted from the handle to validate the sensor data.

15. The non-transitory machine readable medium of claim 14, wherein the validation and verification information comprises checksum information of the sensor data, and wherein the instructions cause the machine to:
evaluate the checksum information of the sensor data to validate the sensor data.

16. The non-transitory machine readable medium of claim 14, wherein the instructions cause the machine to:
extract attestation and traceability information stored within the handle, wherein the attestation and traceability information comprises:
timestamp information of the sensor data;
event information of the sensors collecting the sensor data;
analytics and processing performed upon the sensor data by a particular application at a particular point in time;
locations and times at which the sensor data was stored, transmitted and processed.

17. The non-transitory machine readable medium of claim 14, wherein the instructions cause the machine to:
implementing a replication policy to implement for replication select sensor data between storage devices.

18. The non-transitory machine readable medium of claim 14, wherein the instructions cause the machine to:
implement the migration policy to migrate select sensor data from first storage to second storage based upon the second storage being hosted by a second computing device in communication with a core network where a threshold number of requests for the sensor data are being received.

19. A device comprising:
a memory comprising machine executable code for performing a method; and
a processor coupled to the memory, the processor configured to execute the machine executable code to cause the processor to perform operations comprising:
receiving, by a device of a data network, messages a of sensor data generated by sensors of the data network, wherein the messages comprise handles replacing the sensor data extracted from the messages and offloaded to an offloaded storage environment, and wherein a handle references a storage location of sensor data and associated with attestation and traceability information related to processing performed upon the sensor data by an application;
implementing, by a computing device of the offloaded storage environment, a migration policy to selectively migrate portions of the sensor data amongst different storage locations of the offloaded storage environment based upon sensor data access frequencies, wherein the migration policy specifies that the sensor data is to be migrated to a storage location of a different computing device based upon a threshold number of requests for the sensor data received through a cloud network and a core network of the data network, that infrequently accessed sensor data is to be stored within a first storage location based upon less than a threshold number of requests for the infrequently accessed sensor data, and that frequently accessed sensor data is to be stored within a second storage location based upon greater than the threshold number of requests for the frequency accessed sensor data;
constructing and transmitting a request, comprising the handle and metadata conditions used to select the sensor data, to the computing device for a view of the sensor data, wherein the view is processed by analytics and functionality of the computing device using the metadata conditions to construct the view accessible through a graphical user interface; and
receiving and displaying the view through the graphical user interface.

20. The device of claim 19, wherein the handle comprises identification information of an application that processed the sensor data, analytics performed upon the sensor data, location and times of the sensor data being processed, identification of a sensor that created the sensor data, a location of the sensor, a data type of the sensor data, and a fingerprint of the sensor data for verifying the sensor data, and wherein the machine executable code causes the machine to:
extract from the handle:
the identification information of the application that processed the sensor data;
the analytics performed upon the sensor data;
the location and times of the sensor data being processed;
the identification of the sensor that created the sensor data;
the location of the sensor;
the data type of the sensor data; and
the fingerprint of the sensor data for verifying the sensor data.

* * * * *